(12) United States Patent
Hunter

(10) Patent No.: US 8,146,889 B2
(45) Date of Patent: Apr. 3, 2012

(54) LOW FRICTION COATINGS FOR DYNAMICALLY ENGAGING LOAD BEARING SURFACES

(75) Inventor: Rick C. Hunter, Friendswood, TX (US)

(73) Assignee: Vetco Gray Inc., Houston, TX (US)

( * ) Notice: Subject to any disclaimer, the term of this patent is extended or adjusted under 35 U.S.C. 154(b) by 640 days.

(21) Appl. No.: 11/639,868

(22) Filed: Dec. 15, 2006

(65) Prior Publication Data

US 2007/0163655 A1 Jul. 19, 2007

Related U.S. Application Data

(63) Continuation-in-part of application No. 11/214,433, filed on Aug. 29, 2005, now Pat. No. 7,255,328.

(60) Provisional application No. 60/605,176, filed on Aug. 27, 2004.

(51) Int. Cl.
*F16K 3/00* (2006.01)

(52) U.S. Cl. ......... 251/326; 251/368; 427/450; 427/455

(58) Field of Classification Search ................... 137/375; 251/326, 368; 427/446, 450, 455
See application file for complete search history.

(56) References Cited

U.S. PATENT DOCUMENTS

| | | | |
|---|---|---|---|
| 2,951,497 A * | 9/1960 | Laurent | 137/246.13 |
| 3,633,873 A | 1/1972 | Leopold, Jr. et al. | |
| 3,749,114 A | 7/1973 | Johnstone et al. | |
| 3,763,880 A | 10/1973 | Leopold, Jr. et al. | |
| 4,178,964 A | 12/1979 | Moore et al. | |
| 4,226,914 A * | 10/1980 | Terner et al. | 428/446 |
| 4,771,805 A | 9/1988 | Maa | |
| 4,991,822 A | 2/1991 | Enke | |
| 5,554,415 A * | 9/1996 | Turchan et al. | 427/248.1 |
| 5,727,775 A | 3/1998 | Rodger et al. | |
| 5,762,089 A | 6/1998 | Haeberle et al. | |
| 5,888,638 A | 3/1999 | Kleinhans et al. | |
| 6,042,019 A * | 3/2000 | Rusch | 239/85 |
| 6,165,616 A * | 12/2000 | Lemelson et al. | 428/408 |
| 6,375,157 B1 | 4/2002 | Van de Lande | |
| 6,451,175 B1 * | 9/2002 | Lal | 204/173 |
| 6,672,330 B2 | 1/2004 | Chigasaki et al. | |

(Continued)

FOREIGN PATENT DOCUMENTS

GB 405351 2/1934

(Continued)

OTHER PUBLICATIONS

Nanotechnology, *From Small Dimensions to Big Business*, pp. 1-6—printed from website www.abb.com/global/gad/gad02077.nsf/lupLongContent/CC544D8ED869AE31C12, Pub. Date Feb. 2003.

*Primary Examiner* — Craig Schneider
(74) *Attorney, Agent, or Firm* — Bracewell & Giuliani LLP

(57) ABSTRACT

A gate valve has a body, the body having a cavity and a flow passage intersecting the cavity. A seat ring is mounted to the body at the intersection of the flow passage and the cavity, the seat ring having an engaging face. A gate in the cavity has an engaging face that slidingly engages the face of the seat ring while being moved between open and closed positions. A friction-resistant coating is on at least one of the faces.

7 Claims, 3 Drawing Sheets

U.S. PATENT DOCUMENTS

| | | | |
|---|---|---|---|
| 6,689,424 B1 * | 2/2004 | Wang et al. | 427/456 |
| 6,835,449 B2 * | 12/2004 | Kim et al. | 428/328 |
| 2004/0118455 A1 | 6/2004 | Welty et al. | |
| 2005/0014010 A1 * | 1/2005 | Dumm et al. | 428/472 |
| 2005/0109502 A1 | 5/2005 | Slay et al. | |
| 2005/0150551 A1 * | 7/2005 | Gilbert | 137/375 |

FOREIGN PATENT DOCUMENTS

| | | |
|---|---|---|
| GB | 925555 | 5/1963 |
| WO | WO 00/45030 | 8/2000 |
| WO | WO 2006/026564 A2 | 3/2006 |

* cited by examiner

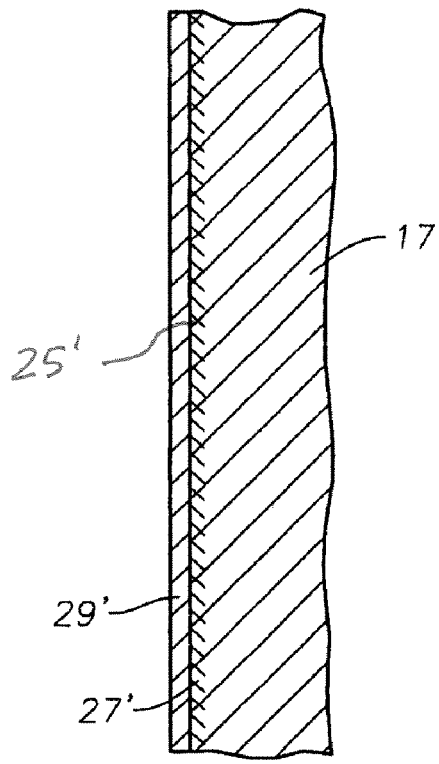
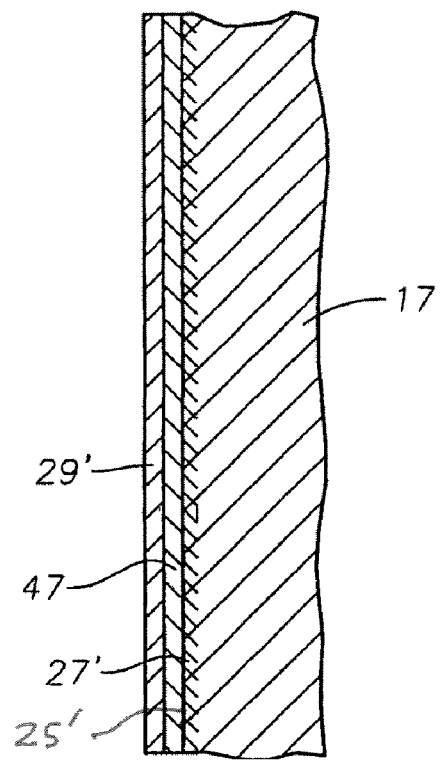
Fig. 5         Fig. 6
Fig. 7
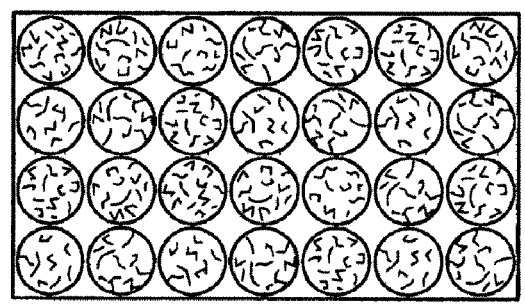

LOW FRICTION COATINGS FOR DYNAMICALLY ENGAGING LOAD BEARING SURFACES

RELATED APPLICATIONS

This application is a continuation-in-part of patent application U.S. Ser. No. 11/214,433, filed Aug. 29, 2005, now U.S. Pat. No. 7,255,328, which claimed the benefit of provisional patent application U.S. Ser. No. 60/605,176, filed Aug. 27, 2004.

BACKGROUND OF THE INVENTION

1. Field of the Invention

The invention relates generally to low friction coatings formed on load bearing surfaces that slidingly engage each other, such as a gate and seat ring of a gate valve for a wellhead assembly.

2. Background of the Invention

Gate valves are used when a straight-line flow of fluid and minimum flow restriction are required. When the valve is wide open, the gate is drawn into the opposite end of the valve cavity. The gate has an opening for flow through the valve the same size as the pipe in which the valve is installed. The valve provides an unobstructed passageway when fully open. It is best suited for main fluid supply lines and for pump lines, and is often used for oil and gas production where pressures may range from 5000 to 30,000 psi.

Previous versions of gate valves have featured a coating on the exterior surface of the valve's gate and seats for reducing friction, as well as to reduce corrosion and improve wear resistance. Some previous versions have utilized layers of hard facing, such as tungsten carbide, upon the surface of the valve's gate and seats. Other previous versions have utilized a vapor deposition process or a chemical vapor deposition to coat the exterior surface of the valve's gate and seats.

Prior art gate valves rely on liquid lubrication to minimize the adhesive forces between these materials. Liquid lubricants, such as hydrocarbon and silicone based greases, decrease in both viscosity and surface tension as their temperature is increased, thereby minimizing the protective boundary layer they offer to the highly loaded surfaces. Additionally, only very expensive greases are stable to temperatures above 400 F and may lose some of their mass and lubricating properties. The loss of lubrication at high temperatures leads to significant increases in valve torques and may lead to the galling of the mating surfaces.

Polymer coatings have been used on sliding load bearing surfaces in general, including on ball valves. Some polymer type coatings have been used on gate valves as well, but suffer from insufficient load bearing capacity and ductility especially at elevated temperatures. A thermoplastic polymer coating tends to creep and flow under high contact stress and elevated temperatures. A thermoset type of polymer coating does not soften with temperature as does a thermoplastic, but suffers from poor ductility and a propensity toward greater adhesion especially at elevated temperatures. These properties generally result in cracks in the coating and the removal of the coating to its mated surface.

SUMMARY OF THE INVENTION

In this invention, an apparatus for a well has first and second components, each having a metal engaging surface that engages the other in a load bearing sliding contact. A polymer coating is formed on at least one of the surfaces. Preferably, the polymer coating contains a quantity of stiffening particulates having average diameters less than 0.5 microns, such as nanotubes.

The polymer coating is preferably a thermoplastic material. Also, in one embodiment, the surface containing the coating has a hardened layer under the coating. The hardened layer might be formed by nitriding, nickel aluminiding, boronizing, or carburizing. The coating is preferably applied by spray dispersion at room temperature.

An apparatus for controlling well fluids, includes a gate valve having a body. The body has a cavity and a flow passage intersecting the cavity. A seat ring is mounted to the body at the intersection of the flow passage and the cavity. The seat ring has an engaging face formed of a steel alloy. A gate is in the cavity and has an engaging face formed of a steel alloy that slidingly engages the face of the seat ring while being moved between open and closed positions. A friction-resistant coating is on at least one of the faces.

In the apparatus the at least one of the engaging faces of the gate and the seat ring can have a hardened outer layer. The friction-resistant coating can be on the hardened outer layer. The friction-resistant coating can include molybdenum disulfide. The friction-resistant coating can include tungsten disulfide. The friction-resistant coating can include a carbon or diamond-like material. The friction-resistant coating can have a thickness in a range of between about 2 and about 8 microns. The friction-resistant coating can have a hardness of at least about 900 on the Vickers scale. The friction-resistant coating can have a hardness in the range of about 900 to about 5000 on the Vickers scale. In the preferred embodiment, the friction-resistant coating has a hardness of at least about 500 on the Vickers scale, and in the range of about 500 to about 5000 on the Vickers scale. In the apparatus, the friction-resistant coating can have an unlubricated coefficient of friction in a range between about 0.03 and about 0.15 and a lubricated coefficient of friction in a range between about 0.01 and about 0.15.

In the apparatus according, the engaging face that has the friction-resistant coating can have a hardened layer under the coating. The hardened layer can include one of the following: a nitrided layer, a nickel aluminided layer, a boronized layer, and a carburized layer.

Another aspect of the invention includes a method of forming a coating on a metal load bearing surface. The method includes the step of providing a gate valve assembly having a valve body with a cavity and a flow passage intersecting the cavity. A seat ring is mounted to the body at the intersection of the flow passage and the cavity. The seat ring has an engaging face formed of a steel alloy. A gate is in the cavity and has an engaging face formed of a steel alloy that slidingly engages the face of the seat ring while being moved between open and closed positions. The method also includes the step of hardening at least one of the engaging faces. The method also includes the step of applying a friction-resistant coating to the hardened engaging face.

The hardening step can include hardening the engaging face through a process selected from nitriding, aluminiding, nickel aluminiding, boronizing, and carburizing. The application step can include that the friction-resistant coating is applied through a process selected from physical vapor deposition and chemical vapor deposition.

Another aspect of the invention includes another method of forming a coating on a metal load bearing surface. The method includes the step of providing a gate valve assembly having a valve body with a cavity and a flow passage intersecting the cavity. A seat ring mounted to the body at the intersection of the flow passage and the cavity. The seat ring has an engaging face formed of a steel alloy. A gate is in the cavity and has an engaging face formed of a steel alloy that slidingly engages the face of the seat ring while being moved between open and closed positions. The method also includes the step of hardening at least one of the engaging faces. The method also includes the step of applying a coating selected from a group consisting of molybdenum disulfide and tungsten disulfide to the hardened engaging face until the coating has a thickness in a range between about 2 microns and about 8 microns.

The hardening step can include that hardening the engaging face through a process selected from nitriding, aluminiding, nickel aluminiding, boronizing, and carburizing. The application of the coating step can include that the coating is applied through a process selected from physical vapor deposition and chemical vapor deposition.

The method can also include the step of applying a lubricant to the coating after the coating is applied to the hardened engaging face. Prior to the hardening step, the method can include the step of texturing the engaging surface being hardened to create a textured surface finish. The application of the coating step can also include that the coating is applied to the textured and hardened engaging face with the textured surface enhancing the application of the coating to the hardened engaging face.

BRIEF DESCRIPTION OF THE DRAWINGS

FIG. 5 is a schematic enlarged sectional view of an alternate embodiment of the gate of the valve of FIG. 1, illustrating a hardened layer and a low friction coating.

FIG. 6 is a schematic enlarged sectional view of an additional alternate embodiment of the gate of the valve of FIG. 1, illustrating an intermediate coating and a low friction coating.

FIG. 7 is a photograph of a textured surface used to improve tribological performance.

DETAILED DESCRIPTION OF THE PREFERRED EMBODIMENT

Figure 1:
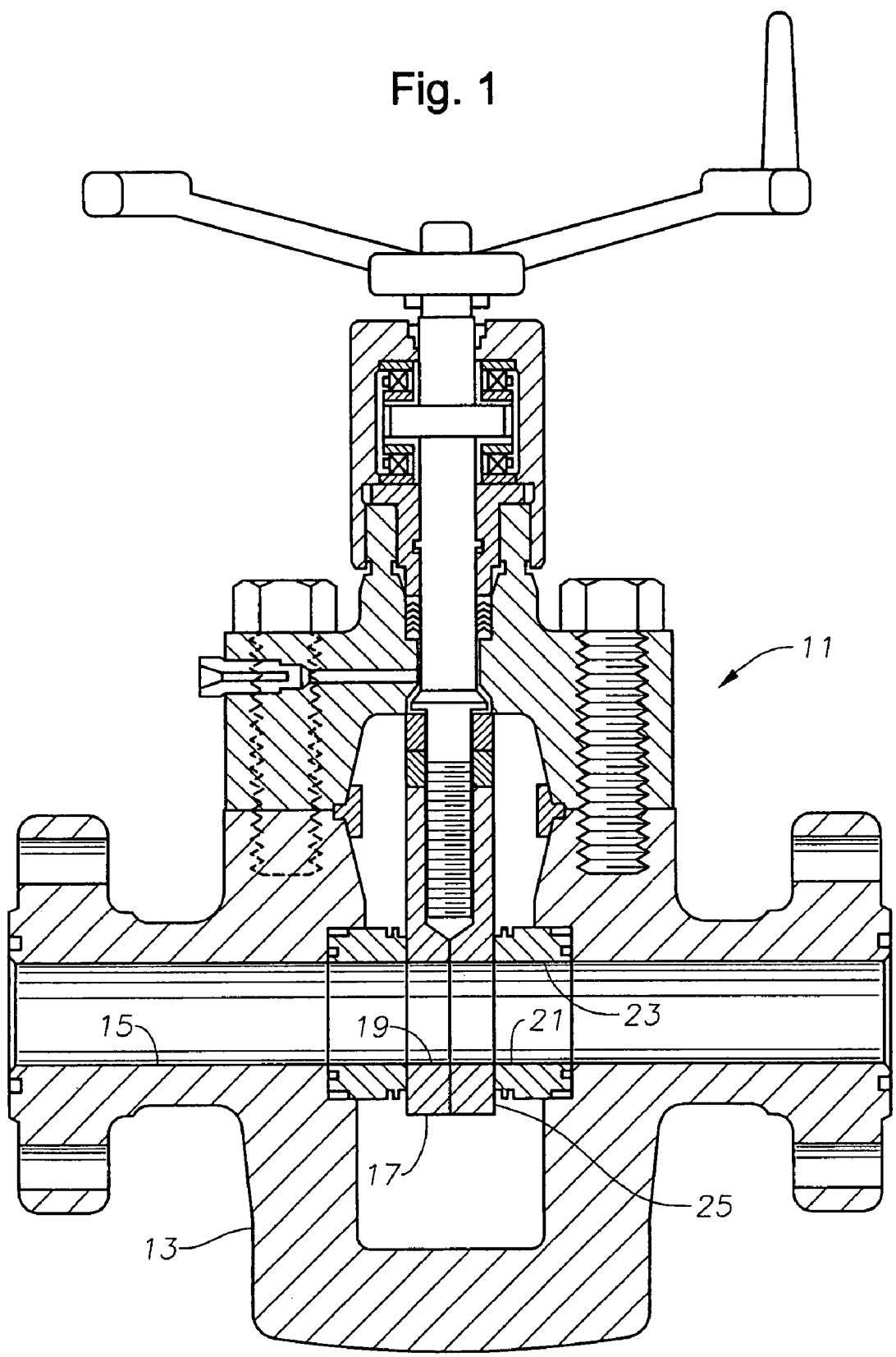
FIG. 1 is a vertical sectional view of a gate valve having a polymer coating on at least one of the interfaces between the gate and seats in accordance with the invention.

Referring to FIG. 1, gate valve 11 has a body 13 and a flow passage 15 that extends transversely through body 13. Valve 11 has a gate 17 with a hole 19 therethrough. Gate 17 is shown in the open position. The gate valve 11 shown in FIG. 1 is a non-rising-stem type valve, but the valve 11 may alternatively be a rising-stem type valve. Also shown in FIG. 1 are ring-shaped valve seats 21, which have holes 23 that register with the flow passage 15 of the valve. Gate valve 11 is shown as a split gate type having two separate slabs, but it could alternatively be a single slab type.

When gate 17 is in the open position, the hole 19 of the gate 17 registers with flow passage 15 of the valve 11, thereby allowing flow through the valve. When the gate is closed, the hole 19 no longer registers with the flow passage 15. The gate 17 has an engaging face 25 on each side that interfaces with seats 21. While gate 17 is closed, typically pressure in the flow passages 15 creates a substantial load on one of the faces 25 against one of the seats 21. Movement of gate 17 to or from the closed position causes one of the faces 25 to slide against one of the seats 21 while exerting contact forces, if one of flow passages 15 is under high pressure. The gate valve 11 shown in FIG. 1 is a forward acting gate valve meaning that gate 17 moves down to close the valve. Alternatively, the valve could be a reverse acting gate valve by repositioning the location of the gate opening.

Gate valve slab or gate 17 is preferably made from corrosion resistant steel alloys such as one of the following: Inconel (a nickel-chrome alloy of steel); high quality low alloy steel; stainless steel; nickel-cobalt alloy steel; or another suitable metal material. Inconel 625 typically has a Rockwell Hardness Number (HRN) in the C scale between 28 and 33. Inconel 718 typically has a Rockwell Hardness Number (HRN) in the C scale between 35 and 40. Material properties can be altered by the heat treatment process. Seats 21 may be formed of the same types of material.

Figure 2:
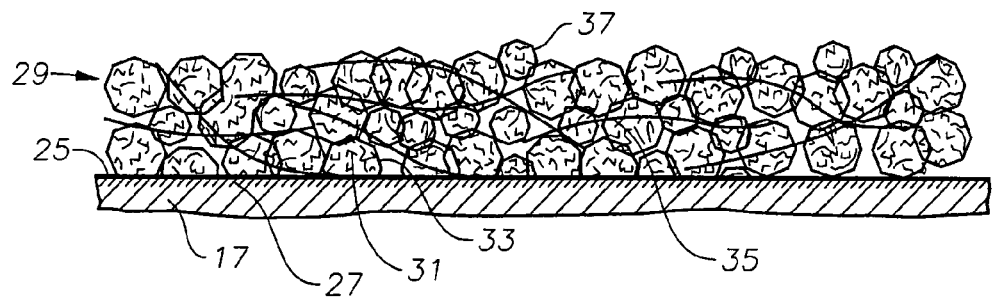
FIG. 2 is a schematic enlarged sectional view of the gate of the valve of FIG. 1, illustrating a hardened layer and a polymer coating, as sprayed onto gate and prior to heating.

Referring to FIG. 2, in one embodiment, each gate face 25 is subjected to an optional hardening process to create a hardened layer 27 before applying a low friction coating 29. The hardening process may include various surface hardening techniques or diffusion processes such as nitriding, aluminiding or nickel aluminiding, boronizing, or carburizing.

Nitriding is a case-hardening process whereby nitrogen is introduced into the surface of a solid metal alloy by holding the metal at a suitable temperature in contact with a nitrogenous substance such as ammonia or nitrogen rich salt. Nitriding includes placing the gate 17 within a chamber or vat and heating the gate 17. The liquid or gas type nitriding temperature for steels is between 495 and 565° C. (925 and 1050° F.). At high temperatures, the nitrogen migrates into the metal and reacts to elements within the metal alloy to form a ceramic compound of nitride. The nitrogen most effectively reacts with titanium, chromium, or other suitable elements. Ion nitriding or Plasma Assisted CVD nitriding may be carried out at lower temperatures.

Aluminiding and boronizing follow a similar procedure whereby aluminum and boron, respectively, are introduced to the part at elevated temperatures. In vapor-phase aluminiding procedures, the evaporate aluminum introduced into the chamber reacts most effectively with nickel. In boronizing procedures, the boron introduced into the chamber reacts most effectively with iron. After the nitriding, aluminiding, boronizing, or other hardening procedure is performed on faces 25 of gate 17, the hardened layer 27 generally extends into the faces 25 of gate 17 for a depth in the range of 0.0005 inches to 0.003 inches. Coating 29 preferably has a thickness of about 0.001 or more.

Before the low friction coating 29 is applied, the surface is preferably textured slightly to create better adhesion for coating 29. The texturing procedure may occur before creating hardened layer 27 or after. The texturing procedure may be performed in a variety of ways, and is performed in one technique by a combination of sand blasting and sanding or lapping. For example, face 25 may be bead blasted with 60 grit beads, then sanded with 400 grit sandpaper. The purpose of sanding or lapping is to lower the peaks creating by the bead blasting step. Ideally, the average depths from valley to peak after sanding will be less than the thickness of the subsequent low friction coating 29 so that the peaks would be covered by coating 29. Optionally, the sanding or lapping step could be followed by another step of bead blasting, but using a smaller size of beads than in the first bead blasting step.

As an alternate to bead blasting and sanding or lapping, the surface of gate face 25 could be textured by creating a porous surface. This could be done by direct application of a laser to the metal alloy of gate face 25 to create small cavities. Additionally, micro-jets of water can be used to texture the surface as well as a variety of chemical etching or milling techniques. Alternately, a porous nickel coating or a thermal spray coating, such as a WC/Co system, could be applied.

Preferably low friction coating 29 comprises a high temperature polymer such as one of the following: PEEK (polyetheretherketone); PEK (Poletherketone); PFA (Perfluoroalkoxy); PTFE (polytetrafluoroethylene); FEP (fluorinated ethylene propylene); CTFE (polychlorotrifluoroethylene); PVDF (polyvinylidene fluoride); PA (Polyamide); PE (Polyethylene); TPU (Thermoplastic Elastomer); PPS (Polyphenylene Sulfide); PC (Polycarbonate); PPA (Polphthalamide); PEKK (Polyetherketoneketone); TPI (Thermoplastic Polyimide); PAI (polyamide-imid); PI (polyimide) or others. Preferably, the polymer is a thermoplastic, but a thermoset plastic could also be employed. A thermoplastic is defined herein as a polymer that can be repeatedly heated to its melting point. PEEK is therefore, for example, a thermoplastic and PAI is not. The preferred polymers are capable of withstanding temperatures up to 450 degrees □F. without degradation.

Also, the preferred polymers have a high strength under compressive loading. For example, some gates 17 must be capable of withstanding up to 60,000 psi of bearing stress between the seat and gate. If coating 29 has a compressive strength below that amount, it will tend to creep or become semi-liquid under high pressure. The tendency to creep is promoted as the operating temperature increases. If sufficient creep occurs, the textured subsurface of coating 29 will penetrate the top coating leading to the scratching of the mating surface, resulting in an increase in friction, an increase in coating wear, and an increase in potential leakage. Preferably, the coefficient of friction of coating 29 remains below 0.03, without supplemental liquid lubrication, for at least 200 cycles through temperature extremes to 450 F or higher. Preferably, the compressive strength is 25,000 psi at room temperature measured under the test ASTM D695, 10% deflection.

One technique to impart stiffness and creep resistance to the polymer of coating 29 is to mix a quantity of stiffening particulates in the polymer 33, such as nano-sized single or multi-wall nanotubes 31 of carbon or boron nitride. Other stiffening particulates include nano-sized fibers and micron-sized fibers such as carbon fibers.

The term "nano-sized" is used herein to mean fibers or particulates, whether tubular or solid, having a diameter of about 0.5 microns or less. Nano-sized particulates are so small that they may interact with the molecules of the polymer, thereby imparting properties not possible with other additives. Property improvements may include increases in creep resistance, compressive strength, tensile strength, wear resistance, abrasion resistance, tear resistance, explosive decompression resistance, elongation to failure, and an increase in the coatings glass transition temperature. Their small size allows them to be sprayed with conventional dispersion coating systems. Moreover, because of the small size, the nano-sized particulates do not significantly affect the surface finish of coating 29. Single and multi-wall carbon nanotubes have diameters much smaller than 0.5 micron, such as 0.015 micron. Other nano-fibers are available in size ranges approximately 10 times larger in diameter than carbon nanotubes. Nanoceramic particulates are generally spherical and may have diameters of approximately 0.05 microns.

Figure 3:
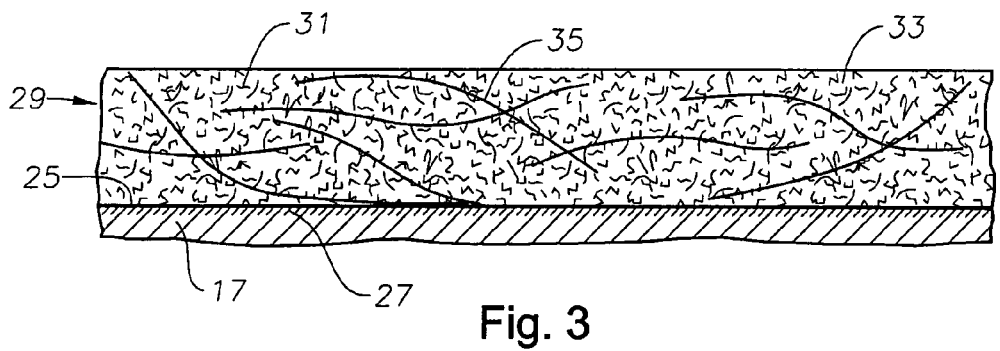
FIG. 3 is a schematic enlarged sectional view of the gate as shown in FIG. 2, but after heat processing the polymer coating.
Figure 4:
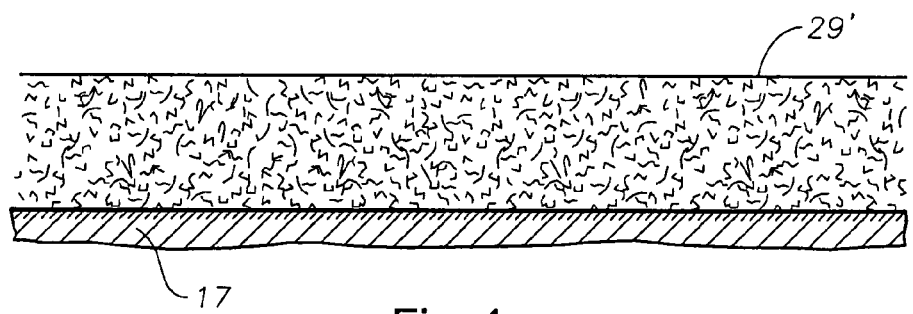
FIG. 4 is a schematic enlarged sectional view of the gate as shown in FIG. 3, but showing an alternate embodiment of the polymer coating.

The term "micron-sized" as used herein refers to particulates, whether fibers or granules, having diameters greater than 0.5 microns. For example, a carbon fiber might have a diameter of 8 microns. Coating 29 in the embodiment of FIGS. 2 and 3 contains a quantity of carbon nanotubes 31 as well as some micron-sized carbon fibers 35, while coating 29' in FIG. 4 does not contain micron-sized carbon fibers 35. Carbon fibers 35 have greater lengths than the lengths of nanotubes 31; for example 150 microns versus about 20 microns for carbon nanotubes 31.

It is also beneficial to add lubricating additives to the coating mixture prior to application to reduce friction. The negative consequence of adding lubricants is to reduce the creep resistance of the coating system. This further increases the need for the creep resistance stiffening additives of the invention. Preferred lubricants may include particulates of polytetrafluoroethylene, molybdenum disulfide, graphite, tungsten disulfide, boric acid, boron nitride, fluorinated ethylene propylene, and perfluoroalkoxy.

Coating 29 is preferably applied by a dispersion technique through a conventional paint spray gun. A quantity of nanotubes 31 or nano-sized particulates are compounded with the polymer 33. The compounded material is reduced into granules 37 (FIG. 2) of sufficiently small size to be applied as a coating by electrostatic dispersion or thermal spray processes. Granules 37 have average diameters less than about 200 microns. In one embodiment, granules 37 have diameters of about 12 microns. Preferably, nanotubes 31 make up at least six percent by volume of each granule 37 to provide the desired stiffness to coating 29. One preferred range is from six to thirty percent by volume.

A surfactant and water are mixed with granules 37 to form a dispersion. Additives for lubrication enhancement may be added to the dispersion. Micron-sized fibers 35, such as carbon fibers, may optionally be added to the dispersion. If so, preferably the quantity of micron-sized fibers 35 by volume to nano-sized fibers 31, is about one to ten. The dispersion mixture is sprayed onto face 25 at room temperature. Then gate 17 is placed in a furnace and heated to a temperature of about 725 degrees F. The temperature is sufficient to melt polymer 31 but is below the first transformation temperature of the steel alloy gate 17, thus does not affect the hardness, whether or not a hardened layer 27 is used. Once cooled, coating 29 becomes solid, durable, and bonded to gate face 25. The longer micron-sized fibers 35, if used, act as reinforcing strands that bind the thermoplastic granules 37, themselves filled with nano-sized fibers 31, together.

Another method of applying the coating to a part is by the use a thermal spray process. In this process the thermoplastic granules 37, filled or not, are mixed with other solid particulates such as lubricants and larger fibers, such as carbon fibers 35. This powder mixture is then sprayed through a gun that melts the mixture before or as it is sprayed onto the part. The part therefore does not need to be thermally processed after the coating is applied.

Yet another method is to charge a dry powder mixture and apply the powder coating to the part electrostatically. The part is subsequently heated to melt and bind the particulates. This process is normally used for thick polymer coatings Multiple coatings may be applied to the part to impart unique properties. For example a first layer with micron-sized fibers, as well as other nano-sized particulates, may be applied to increase creep resistance and compression strength. A top coat without the fibers and particulates may be applied to obtain low frictional properties.

While the use of a thermoplastic is discussed in some detail, many of the methods described herein are applicable for use with thermoset materials. In particular, polyamide-imid (PAI) is a polymer that can be processed in a solution of water or solvent. Additives can be added to achieve a wide range of properties. Nanotubes or nanofibers may be added to the solution to improve coating properties. If dried at a low temperature, the PAI binder system provides for a good low temperature coating. When heated to about 500 F, the PAI reacts to form a polyimide material thereby greatly improving the thermal properties of the polymer in the coating.

Coating 29 may also be applied to the faces of seats 21 in the same manner as described in connection with gate face 25. Coating 29 could be omitted from gate face 25, or both seat 21 and gate face 25 could have a coating 29. No hydrocarbon-based liquid lubricant or grease is required in conjunction with gate face 25 and seat 21. The addition of a liquid lubricant, however, can reduce the start up friction of the valve system.

When moving the gate 17 across the seat face 21, low friction coating 29 provides for a reduced coefficient of friction, reduced wear, and galling prevention. The approximate unlubricated or dry coefficient of friction is in the range of approximately 0.01 to 0.03 even after numerous cycles of use. The low coefficient of friction reduces torque requirements to cycle the gate. Wear rates are substantially reduced during gate valve 17 operations by virtue of the coating.

Reducing the work energy and torque required to operate the gate valve effectively extends low-cost non-rising stem designs to larger sizes and higher pressure ratings without the use of complex gear reducers or expensive rolling element devices. The invention enables gate valves to better withstand contact stresses, and provides for improved wear resistance. The invention also increases the valve's operating temperature. Eliminating liquid lubricants enables the gate valve to qualify for higher temperature ratings, such as 450 degrees F. Such advantages will provide a significant cost and performance advantage over previous versions in the art.

In addition to applying coatings as described to components of a gate valve, there are other applications, particularly in connection with oil and gas well surface equipment. For example, threads of high load fasteners may contain such a coating. Fasteners of this category include bolts used to fasten sections of offshore drilling riser together. Coatings of the type described could also be used on ball valves and tensioners for tensioning offshore riser strings.

In an alternative embodiment shown in FIGS. 5 and 6, an exterior portion of face 25' is subjected to an optional a hardening process to create a hardened layer 27' before applying a low friction or friction-resistant coating 29'. The hardening process may include various surface hardening techniques or diffusion processes such as nitriding, aluminiding, nickel aluminiding, boronizing, or carburinzing, as discussed above herein, or through thermal spraying, cladding, or electroplating. Examples of materials that can be applied through a thermal spray process include tungsten carbide in a cobalt matrix, or silicone carbide in a cobalt matrix.

Before the low friction coating 29' is applied, face 25' is preferably textured slightly to create better adhesion for coating 29'. One method of texturing face 25' is that a laser may be utilized on the face 25' for defining very small cavities extending approximately 0.001 inches into the face 25' of gate valve 17. The laser application can be used with both lubricated surfaces or non-lubricated surfaces, and can be performed either before or after the hardening process.

After the exterior face 25' is hardened as in FIG. 5, low friction coating 29' is applied thereupon. The low friction coating 29' is applied by way of physical vapor deposition (PVD), chemical vapor deposition (CVD), or alternatively by another binderless spray process. Low friction coating 29' is primarily made from carbon or diamond-like material, molybdenum disulfide, tungsten disulfide, or another suitable material. Low friction coating 29' is preferably thin, having an approximate thickness in the range of 2 microns to 8 microns.

Low friction coating 29' forms a hard layer, sometimes having a hardness greater than the hardened layer 27'. The hardness of low friction coating 29' may be in the vicinity of 900 to 5000 or more on the Vickers scale.

There are various known processes for applying low friction coating 29'. One technique, described in U.S. Pat. Nos. 4,987,007 and 5,098,737, creates amorphous diamond coatings. In this process, ions are extracted from a laser ablation plume in a vacuum environment at room temperature. The ions are accelerated through a nozzle for deposit on a substrate. Other processes utilize various Chemical Vapor Deposition processes such as plasma assisted CVD.

In operation, when moving the gate 17 across the seat face 21, the hardened surface and the low friction coating 29' provide for a reduced coefficient of friction, reduced wear, and galling prevention. The approximate unlubricated or dry coefficient of friction is in the range of approximately 0.03 to 0.15, and the approximate lubricated coefficient of friction is in the range of 0.01 to 0.1. These coefficients of friction and wear rates are substantially reduced during gate valve 17 operations by virtue of the hardened face 25' coupled with the low friction coating 29'. Textured surfaces of the mating parts further reduce friction and wear by minimizing solid surface contact by enhancing the ability of the lubricant film to support the load. A representative view of a textured surface is shown in FIG. 7.

An alternative procedure to the diffusion processes described above is applying an intermediate coating 47, without performing the aforementioned heat treatment hardening process. The intermediate coating 47 would be applied to the exterior face 25' of the gate 17, after which the low friction coating 29' would be applied on top of the intermediate coating 47. In this manner, the intermediate coating 47 may substitute for the hardened layer 27' of the gate 17, or alternatively the intermediate coating 47 may be utilized in conjunction with hardened layer 27'. The intermediate coating 47 is typically made from such hardened materials such as titanium nitride (TiN), Chromium Nitride (CrN), Titanium Aluminide (TiAl), or other sufficiently hardened material. The intermediate coating 47 may also be an electroless or electro-deposited type coating. The intermediate coating 47 is generally in the approximate range of 2 microns to 8 microns in thickness, but may be as much as 50 microns.

The invention has several important advantages. The low friction coatings reduce the valve work and torque by minimizing the frictional sliding forces at the gate to seat interface and at the stem to drive bushing interface. Reducing the work energy and torque required to operate the gate valve effectively extends low-cost non-rising stem designs to larger sizes and higher pressure ratings without the use of complex gear reducers or expensive rolling element devices. The invention enables gate valves to better withstand contact stresses, and provides for improved wear resistance. The invention may also increase the valve operating temperature. Such advantages will provide a significant cost and performance advantage over previous versions in the art.

Although some embodiments of the present invention have been described in detail, it should be understood that various changes, substitutions, and alterations can be made hereupon without departing from the principle and scope of the inven- That claimed is:

1. A method of manufacturing a valve, comprising:
thermally spraying tungsten carbide in a cobalt matrix to a selected load bearing surface of a component of the valve to produce a hardened layer on the load bearing surface;
applying a low friction coating of diamond-like carbon layer to the hardened layer;
assembling the component in the valve with the diamond-like carbon layer in sliding engagement with an engaging surface of the valve; and
wherein the load bearing surface comprises an engaging face of a seat ring of the valve and the engaging surface comprises a face of a gate of the valve that is moved linearly across the engaging face on the seat ring.

2. The method according to claim 1, further comprising applying a lubricant to the diamond-like carbon layer.

3. The method according to claim 1, further comprising the step of texturing the load bearing surface prior to applying a thermal spray to create a textured surface finish.

4. The method according to claim 1, wherein
the face of the gate comprises a steel alloy that is free of a diamond-like carbon layer.

5. A method of manufacturing a valve, comprising:
thermally spraying tungsten carbide in a cobalt matrix to a surface of a valve component to deposit a hardened layer;
applying a diamond-like carbon layer to the hardened layer on the surface of the valve component using a vapor deposition process;
assembling the valve component in the valve with the diamond-like carbon layer in sliding engagement with a steel alloy surface of the valve; and
wherein the valve component comprises a seat ring and the steel alloy surface comprises an engaging face of a gate that is moved linearly across the diamond-like carbon layer on the seat ring.

6. The method as recited in claim 5, further comprising applying a lubricant to diamond-like carbon layer.

7. A method of manufacturing a gate valve, comprising:
thermally spraying tungsten carbide in a cobalt matrix to an engaging face of a seat ring of the gate valve to produce a hardened layer;
applying a low friction coating comprising a diamond-like carbon layer to the hardened layer on the engaging face of the seat ring of the gate valve using a vapor deposition process;
installing the seat ring in the gate valve;
installing a gate within the gate valve, the gate having a steel alloy surface;
applying a grease to at least one of the steel alloy surface and the diamond-like carbon layer; and
moving the gate linearly with the steel alloy surface sliding across the diamond-like carbon layer on the engaging face of the seat ring.

* * * * *